United States Patent [19]

Buchholz et al.

[11] Patent Number: 5,024,265

[45] Date of Patent: Jun. 18, 1991

[54] ZONE CONTROL SYSTEM PROVIDING SYNCHRONIZATION OF SYSTEM OPERATION WITH THE ZONE OF GREATEST DEMAND

[75] Inventors: Robert L. Buchholz, Eden Prairie; Eric W. Grald, Maple Plain; Lorne W. Nelson, Bloomington; Dipak J. Shah, Eden Prairie, all of Minn.

[73] Assignee: Honeywell Inc., Minneapolis, Minn.

[21] Appl. No.: 451,705

[22] Filed: Dec. 18, 1989

[51] Int. Cl.⁵ .............................................. F24F 7/00
[52] U.S. Cl. ..................................... 165/22; 236/49.3
[58] Field of Search ......................... 165/22; 236/49.3; 237/8 R

[56] References Cited

U.S. PATENT DOCUMENTS

| | | | |
|---|---|---|---|
| 3,482,623 | 12/1969 | Betz | 165/22 |
| 3,949,807 | 4/1976 | Tyler | 165/22 |
| 4,830,095 | 5/1989 | Friend | 236/49.3 X |

*Primary Examiner*—William E. Wayner
*Attorney, Agent, or Firm*—Roger W. Jensen

[57] ABSTRACT

A zone control system uses signals from a plurality of separate zone thermostats to determine the zone of greatest thermal load or demand. Specifically, the on-time of each thermostat signal is integrated with respect to time so that the zone of greatest demand can be determined. The thermostat signal from the zone of greatest demand is used to control a duct damper between that zone and a heating/cooling plant. To synchronize the opening of the other zone duct dampers with the duct damper of the zone of greatest demand, the length of each of the on-periods of the thermostats in the other zones is first converted to the cycle rate of the zone of greatest demand thermostat since the other thermostats are operating at different duty cycles. A microprocessor-based master zone controller uses these converted on-signals to control respective zone duct dampers in the other zones coincident with the start of the thermostat on-period of the zone of greatest demand. Thus, the duty cycle of these duct control signals is equal to the duty cycles of the thermostats in the corresponding zones, but the control signals have time periods equal to that of the control signal for the zone of greatest demand.

22 Claims, 3 Drawing Sheets

ZONE CONTROL SYSTEM PROVIDING SYNCHRONIZATION OF SYSTEM OPERATION WITH THE ZONE OF GREATEST DEMAND

BACKGROUND OF THE INVENTION

1. Field of the Invention

The present invention relates to thermostats. More specifically, the present invention is directed to a plural zone control system using respective zone thermostats.

2. Description of the Prior Art

Conventional heating and cooling systems for residential buildings are typically controlled with a single thermostat. Thus, only one temperature can be specified by the homeowner. The temperature in the vicinity of the thermostat will be controlled to the desired level, but in other parts of the house the temperature can vary widely due to inadequate air distribution, solar radiation entering through south facing windows, outdoor wind, heat generated by people and appliances and many other factors. In response to these problems and the desire for greater comfort and flexibility, so-called "zoned" systems have been developed. A zoned system allows different parts of a residence to be controlled at different temperatures or at equal temperatures. This is accomplished by a separate thermostat in each temperature zone and a means for controlling the flow of heat or cool to that zone. The most common heating/cooling system is the so-called forced warm air system. In a zoned system of this type, dampers are placed in the ductwork to allow the airflow to each zone to be turned on or off or to be modulated.

Although the zoned heating/cooling system described above offers the advantages of greater comfort through the more accurate control of temperature, greater flexibility by allowing the homeowner to set different temperatures through the house and the potential for energy savings by discontinuing the heating or cooling of unoccupied areas of the home, these systems also have some disadvantages. In its most common form, a zoned system allows each individual thermostat to turn on the heating/cooling plant (furnace, air conditioner, etc.) and simultaneously open the corresponding zone damper while closing the dampers to other zones not requiring heating/cooling. While this approach is quite simple and easy to implement in practice, it creates the following problems. With several individual thermostats independently turning the heating/cooling plant on and off, this appliance will experience significantly more cycles than normal and the service life of the plant will therefore be shortened. For example, without coordinating the calls for heating or cooling, the potential exists for short-cycling the plant, e.g., thermostat A might shut off the furnace, but thermostat B turns it back on 15 seconds later). These short cycles can damage the heating/cooling plant.

Further, when only one zone thermostat requests or calls for heat, the entire output of the heating plant (which is normally capable of heating the entire house) will be supplied to that zone causing large fluctuations in air temperature. When only one zone thermostat calls for heat, the air flow rate through the heating plant may be reduced because the ductwork to that zone cannot conduct the full flow capacity of the blower. This may lead to excessive temperatures in the plant and may cause the high temperature safety switch to trip repeatedly. On the other hand, during cooling operation, the reduced airflow can lead to ice formation on the cooling heat exchanger and similar safety and reliability problems. The present invention is directed to a zone control system that addresses the problems discussed above by allowing multiple thermostat requests to be coordinated such that the air flow through the system is maximized, and the on/off cycles of the plant are minimized.

SUMMARY OF THE INVENTION

An object of the present invention is to provide an improved zone control system using thermostat output signals from a plurality of respective zones.

Another object of the present invention is to provide an improved zone control system for a plurality of zones by synchronizing the system operation with the zone of greatest demand.

In accomplishing these and other objects, there has been provided, in accordance with the present invention, a zone control system comprising a plurality of zone thermostats arranged to produce respective on/off output signals corresponding to the temperature induced demands of their respective zones, a plurality of zone control devices with each of said devices controlling a respective one of the zones, zone controller means for determining a zone of greatest demand distinct from a zone of lesser demand, for converting the length of the on-periods of the output signals of the other thermostats representing the zone of lesser demand relative to the duty cycle of the thermostat of the zone of greatest demand and for synchronizing the start of converted signals representing the zone of lesser demand with the start of the control signal for the zone of greatest demand, and means for applying the synchronized start signals with the on-period of the zone of greatest demand to respective zone control devices.

BRIEF DESCRIPTION OF THE DRAWING

A better understanding of the present invention may be had when the following detailed description is read in connection with the accompanying drawings, in which.

DESCRIPTION OF THE PREFERRED EMBODIMENT

Figure 1:
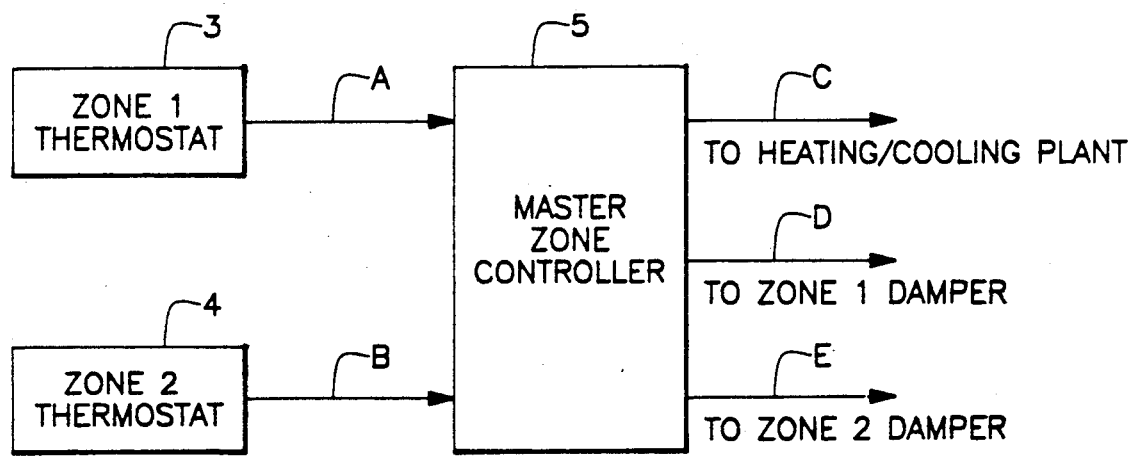
FIG. 1 is a block diagram of an example of a zone control system embodying an example of the present invention.
Figure 2:
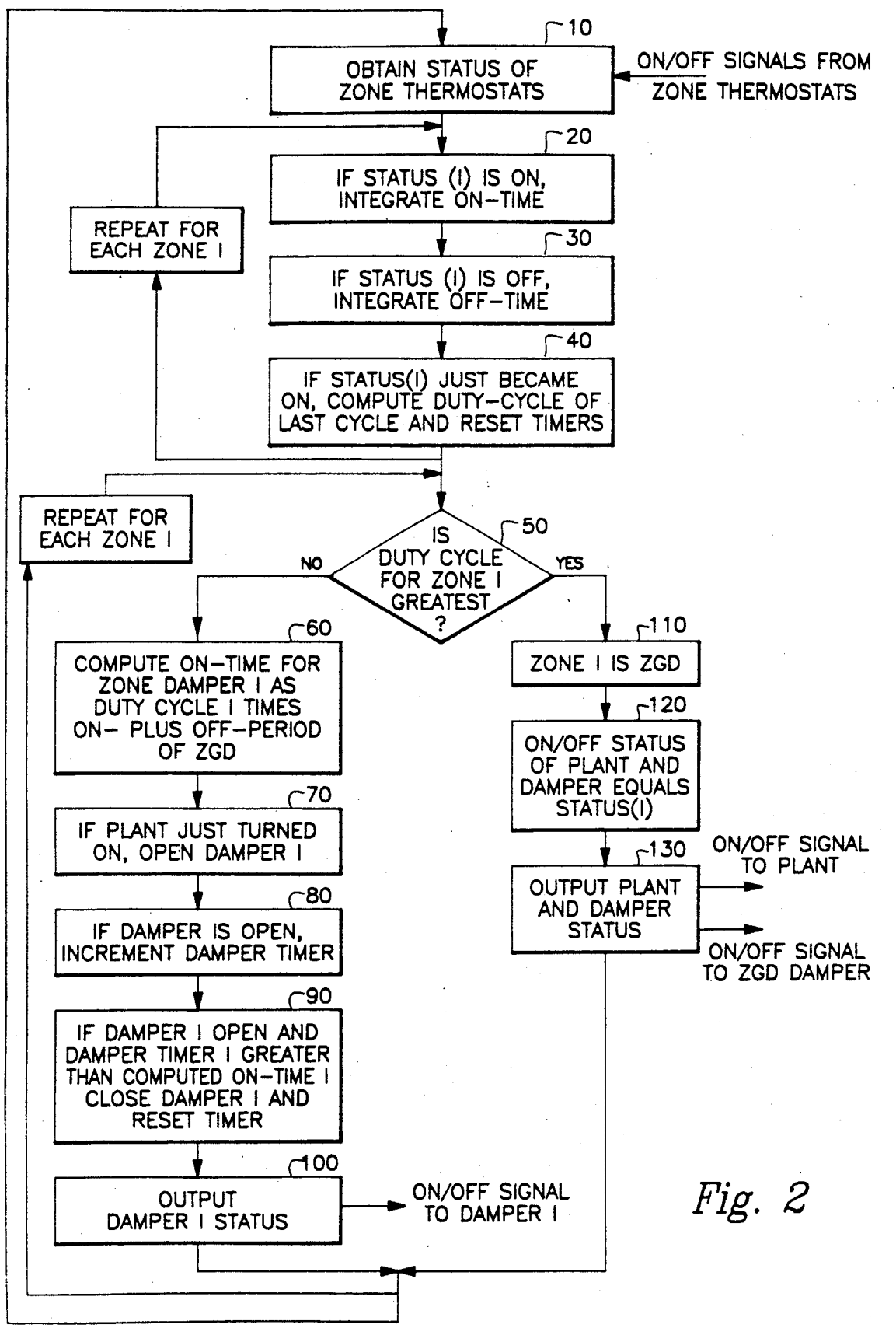
FIG. 2 is a flow diagram for the control program of a microprocessor used in the master zone controller shown as one of the elements of the system of FIG. 1.

FIG. 1 is a block diagram of a two-zone system and the discussion hereinafter is directed to such a two-zone system as an example. It is recognized that the system of the present invention could easily be adapted to control more than two zones. As shown in FIG. 1, the zoning control system includes a plurality of single-stage zone thermostats, e.g., thermostats 3,4 which are arranged to produce respective output signals A,B for application to a master zone controller 5. The master zone controller 5 may preferably incorporate a microprocessor operating according to a fixed stored program located in a computer memory, the operation of such microprocessors being well-known in the art. A flow chart of an example of such a program is shown in FIG. 2 and described hereinafter. The master zone controller 5 is arranged to produce a plurality of output signals. Specifically, the master zone controller 5 produces a first output signal C for application to a heating/cooling plant (not shown). A second output signal D is applied to a damper in a duct line (not shown) leading from the heating/cooling plant to zone 1 and a third output signal E is applied to a damper in a duct line (not shown) leading from the heating/cooling plant leading to zone 2.

The thermostats 3,4 generate on/off output signals A,B in response to the thermal load in their respective zones. These signals A,B are monitored by the zone controller 5. The zone controller 5 is arranged to integrate with respect to time the on- and off-times of each of the thermostat signals A,B so that the zone of greatest thermal demand (ZGD) or greatest thermal load can be determined.

Various methods can be used to determine this zone of greatest demand (ZGD). A quantity called the duty-cycle can be computed for each zone according to:

$$\text{duty-cycle} = \frac{\text{length of on-time}}{\text{length of on-time plus off-time}}$$

duty-cycle = length of on-time length of on-time plus off-time so that the zone with the largest thermostat duty-cycle is the ZGD. Alternatively, the ZGD is the zone with the longest thermostat on-time or the zone with the shortest thermostat off-time. The thermostat signal from the zone of greatest demand is used to produce output signals for controlling the damper associated with that zone and the heating/cooling plant.

Alternatively, the zone controller may be supplied with the temperature in each zone by means of individual zone temperature sensors. The sensed temperature in each zone can then be compared with the desired control point temperature to form an error signal. The zone with the largest error signal is the ZGD. Alternatively, the error signal may be determined by external means and supplied directly to the zone controller.

To synchronize the opening of the dampers in the other zones, called zones of lesser demand or ZLD's, with the initiation of a heating/cooling plant on-cycle and the opening of the damper in the ZGD, the zone controller must first compute the on-periods of the dampers in the ZLD's. In the preferred embodiment, this is accomplished by multiplying the duty-cycle of the thermostat signal in each ZLD by the length of the on-period plus off-period of the thermostat signal in the ZGD. The master zone controller 5 then outputs these computed on-signals to the other zone dampers coincident with the start of the on-period of the ZGD. The duty-cycle of the controller output signals is equal to the duty-cycles of the thermostats in the corresponding zones but have a time period that is equal to that of the ZGD. Thus, the amount of time during which all zone dampers are open simultaneously is maximized. Since the heating/cooling plant is being controlled in a conventional manner, i.e., by one thermostat, the number of on/off cycles experienced by the plant will be very similar to a conventional, single-zone system. Also, by allowing the plant to be controlled by only one thermostat, the short cycling of the plant will be prevented. Since the amount of time when all zone dampers are open is maximized, the amount of time when all of the plant heating/cooling capacity is delivered to only one zone is minimized. This will reduce the degree of room temperature fluctuations. Maximizing the airflow through the heating/cooling plant will prevent an excessive furnace temperature and the build-up of ice on an air conditioner heat exchanger coil.

Figure 3:
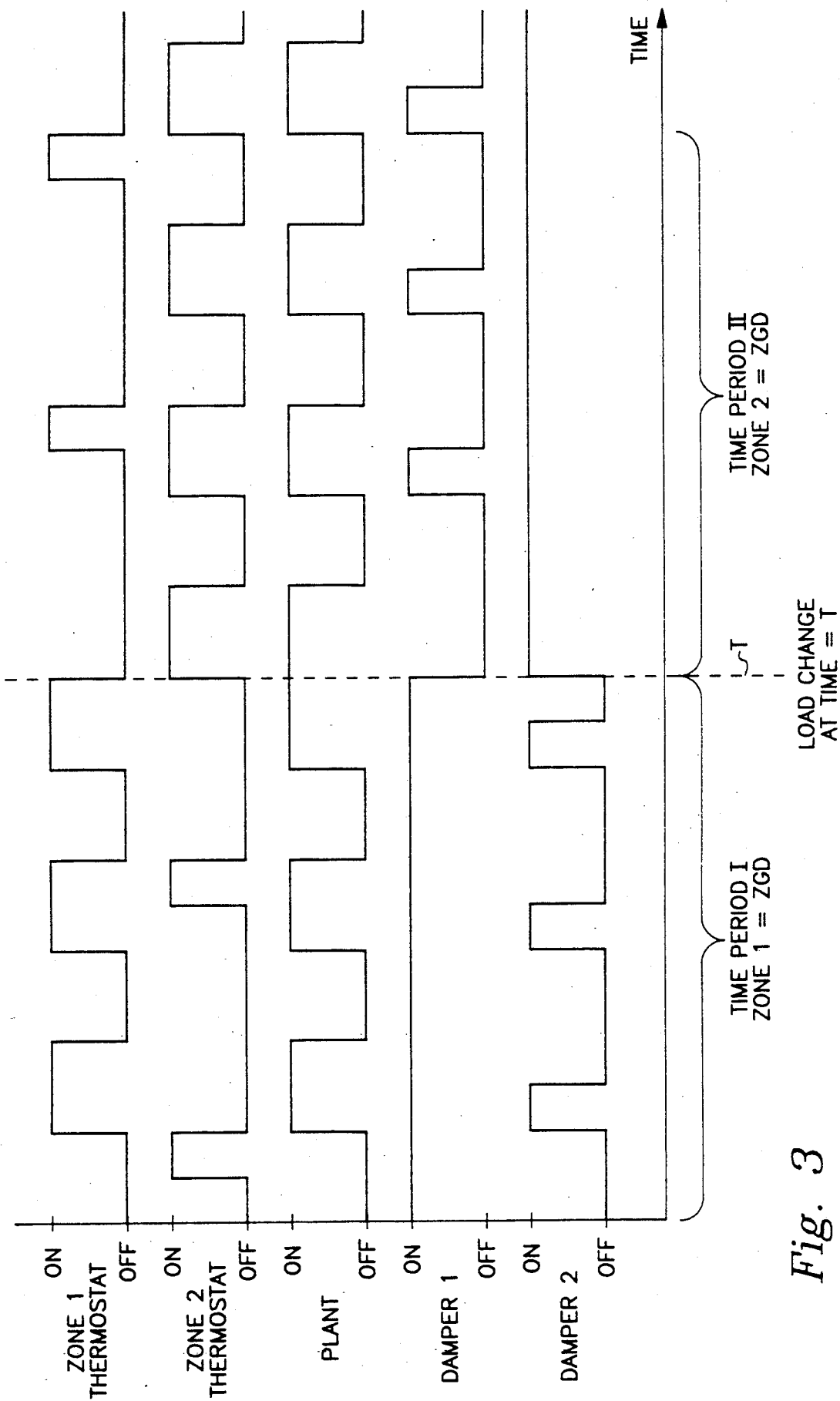
FIG. 3 is a waveshape diagram illustrating the operation of the system shown in FIG. 1.

The operation of the preferred embodiment of the present invention will now be discussed in detail, with reference made to FIGS. 2 and 3. FIG. 2 is a flow chart which describes the programmed logic that is executed by the microprocessor in the master zone controller 5. FIG. 3 is a graph showing the status of the on/off input and output signals at the master zone controller 5 that would occur during a typical operation.

It should be understood that the series of operations shown in the flowchart in FIG. 2 represents a loop and are to be repeated several times per minute. The first step, shown in block 10 of FIG. 2, is to obtain the current on/off status of the zone thermostats which are connected directly to the master zone controller 5. It should be understood that the remaining steps of the control program are to be repeated for each zone i, where i is incremented from 1 to the number of zones. Thus, in block 20, if the signal coming from the $i^{th}$ zone thermostat is "on", the on-time for that zone is integrated over the elapsed time since the previous execution of block 20 for that zone. Conversely, if the thermostat signal for zone i is "off", the off-time is integrated in block 30. In block 40, the duty-cycle for that zone can be calculated. The steps of blocks 20, 30 and 40 are then repeated for the remaining zones.

In block 50, the duty-cycle of the ith zone is compared with the computed duty-cycles of the other zones. If the duty-cycle for the $i^{th}$ zone is numerically the largest, that zone is then designated the "zone of greatest demand", or ZGD, and the block 110 step is executed. In block 120, the output signal is set according to the thermostat on/off status in the ZGD. The on/off signal to the damper for the ZGD is also determined in the same manner. In block 130, these output signals are sent to the plant and ZGD duct damper, respectively.

If, on the other hand, the duty-cycle for the ith zone is less than any of the computed duty-cycles of the other zones, the algorithm proceeds from block 50 to block 60. In block 60, the on-time for damper i is computed by multiplying the duty-cycle of zone thermostat i times the sum of the last on- and off-periods of the thermostat signal for the ZGD. If the heating/cooling plant has just turned on, the zone damper for zone i is opened in block 70. In block 80, if damper i is open, then damper timer i is integrated over the time period since the last execution of the control algorithm. The damper timer i is compared with the computed on-time for zone i in block 90 and if the value of the timer exceeds the computed on-time, the damper is closed. Timer i is then reset to zero. Up to this point, the damper on/off status for zone i has only been determined in the control program. In block 100, the actual damper for zone i is opened or closed by an on/off signal that is an output by the master zone controller. The steps of blocks 50 through 130 are then repeated for the remaining zones.

The description of the zone control algorithm is now augmented through the description of an operative example. At the top of FIG. 3 are shown the on/off signals of two zone thermostats over a period time. These signals are inputs to the master zone controller. During Time Period I, the signal coming from the thermostat is zone 1 consists of a 5-minute "on" period and a 5-minute "off" period. Thus the duty-cycle for zone 1 is $(5 \div (5+5)) \times 100$, or 50 percent. The signal during this time from the zone 2 thermostat is 3 minutes "on" and 12 minutes "off", corresponding to a duty-cycle of $(3 \div (3+12)) \times 100$, or 20 percent. Thus, zone 1 is the ZGD since 50 percent is the greatest duty-cycle. The thermostat signal from zone 1 therefore controls the heating/cooling plant as shown in Time Period I in FIG. 3. Rather than also cycle damper 1 on and off at a 50 percent duty-cycle, the damper in the ZGD (damper 1) is shown to be open continuously during Time Period I in this example. This allows the energy from the plant during the blower overrun period to be delivered only to the ZGD and also decreases the number of cycles experienced by the damper.

Note that the cycling rates of the two thermostats are different because they are operating at different duty-cycles. The number of on/off cycles per hour (cph) for the zone 1 thermostat is $60 \div (5+5)$ or 6. For zone 2, the cycling rate is $60 \div (3+12)$ or 4 cph. The control objective is to cycle the damper for zone 2 at a 20 percent duty-cycle at a 6 cph cycling rate while the on-time for the damper must coincide with the on-time of the plant.

The master zone controller cannot use the on-time from the thermostat in zone 2 (because its cycle rate does not match the cycle rate of the plant), but must compute a new on-time based on a 20 percent duty-cycle at 6 cph. This is done by multiplying the duty-cycle by the on- plus off-period of the ZGD thermostat signal: $(20 \div 100) \times (5+5)$, or 2 minutes. Thus, damper 2 is opened for 2 minutes at the beginning of each plant on-cycle as shown at the bottom of FIG. 3.

Assume that there is a change in the thermal loads (i.e., heating/cooling requirement) of zones 1 and 2 at time T as shown in FIG. 3. This load change may be caused by a change in outdoor weather conditions, a change in occupancy levels of the two zones, or a change in the temperature setpoints for each zone. Regardless of the cause, the two zone thermostats have reacted to the change in load by cycling at different duty-cycles during Time Period II. Zone 1 now has a duty-cycle of 20 percent and zone 2 has a 50 percent duty-cycle. Zone 2 has therefore become the ZGD. The heating/cooling plant is therefore controlled by the on/off signal from the zone 2 thermostat and damper 2 is open continuously for the reason noted above. Now damper 1 is cycled open and closed at a 20 percent duty-cycle at the cycle rate of the plant. Thus damper 1 is open for 2 minutes at the beginning of each plant on-cycle.

It is therefore seen that with this system a means is provided for controlling a zoned heating/cooling system according to the thermal demands of a number of zones. The heating/cooling plant is controlled only by the thermostat in the so-called zone of greatest demand (ZGD) and the opening of the dampers in the other zones is synchronized with the on-period of the plant. The system therefore has the many benefits discussed earlier compared to conventional zoned systems including reduced plant cycling rate, "normal" plant on- and off-times (i.e., elimination of very short cycles), maximized airflow through the plant to reduce high and low temperature conditions, and reduced time during which all of the plant heating/cooling capacity is delivered to one zone. As previously mentioned, it is understood that the invention disclosed here is not limited to the control of two zones. Also, it is contemplated that this invention can be applied to other types of heating/cooling systems besides the forced warm air type (e.g., hydronic).

Accordingly, it may be seen that there has been provided, an improved zone control system for a plurality of zones by synchronizing the system operation with the zone of greatest demand.

The embodiments of the present invention in which an exclusive property or privilege is claimed are defined as follows:

1. A zone control system comprising
   a plurality of zone thermostats arranged to produce respective on/off output signals corresponding to the temperature induced demands of their respective zones,
   a plurality of zone control devices with each of said device controlling a respective one of the zones,
   zone controller means for determining a zone of greatest temperature induced demand distinct from a zone of lesser demand, for converting the length of the on-periods of said output signals representing the zone of lesser demand relative to the duty cycle of the zone of greatest demand and for synchronizing the start of the converted signals representing the zone of lesser demand with the start of the control signal for the zone of greatest demand and
   means for applying the synchronized start signals to respective ones of said zone control devices.

2. A system as set forth in claim 1 wherein said zone controller means includes means for integrating the on-periods of each of said thermostats to determine the zone of greatest demand.

3. A system as set forth in claim 1 wherein said zone control devices are zone duct dampers.

4. A system as set forth in claim 1 wherein said zone controller means includes a microprocessor operating according to a stored program.

5. A system as set forth in claim 1 wherein the zone of greatest demand is determined as the zone which has the greatest thermostat duty cycle as defined by the length of the thermostat signal on-period divided by the length of the thermostat on-plus off-period.

6. A system as set forth in claim 1 wherein the zone of greatest demand is determined as the zone which has the longest thermostat on-time.

7. A system as set forth in claim 1 wherein the zone of greatest demand is determined as the zone with the shortest thermostat off-time.

8. A system as set forth in claim 1 and further characterized by said controller means being effective to: (a) open the damper in the duct leading to the zone of greatest demand coincident with the beginning of operation of said heating/cooling means, (b) simultaneously open the dampers corresponding to the remaining zones requiring heat/cool as zones of lesser demand, (c) keep the dampers open to the zones of lesser demand for a time period equal to the error signal for each zone divided by the error signal of the zone of greatest demand times the length of the thermostat on-period in the zone of greatest demand and (d) close the dampers to the zones of lesser demand.

9. A zoned heating/cooling system comprising:
   a heating/cooling means
   a distribution means including means for proportioning a heating/cooling output from said heating/cooling means to a plurality of zones;
   a plurality of zone thermostats with each of said thermostats being arranged to produce on-off signals corresponding to temperature induced demands of respective ones of the zones;

zone controller means connected to said thermostats to receive the on-off signals, to said heating/cooling means to control on-off operation of said heating/cooling means and to said distribution means to proportion the heating/cooling means output between the plurality of zones, said controller means determining the zone of greatest temperature induced demand and operating said heating/cooling means according to the thermostat signal from the zone of greatest demand and proportioning the output from said heating/cooling means by operating said distribution means in response to the thermal load of each zone, said zone controller means operating said distribution means synchronously with said thermostat signal from the zone of greatest demand.

10. A system as set forth in claim 9 wherein said distribution means includes a duct from said heating/cooling means to each of the plurality of zones and said means for proportioning includes a selectively operatively duct damper in each of said ducts.

11. A system as set forth in claim 10 wherein said controller means is effective to open the damper in the duct leading to the zone of greatest demand concurrently with a beginning of operation of said heating/cooling means, to open the dampers in the ducts to the other zones identified as zones of lesser demands for a predetermined time period less than the on-period of said heating/cooling means and to close the duct dampers to the zones of lesser demand for the remainder of the on-period of said heating/cooling plant.

12. A system as set forth in claim 11 wherein the dampers in the ducts to the zones of lesser demand are opened for a time period equal to the duty-cycle of said zone thermostats in said zone of lesser demand multiplied by the length of on-time plus off-time of the thermostat in the zone of greatest demand.

13. A system as set forth in claim 9 wherein the zone of greatest demand is determined as the zone which has the greatest thermostat duty cycle as defined by the length of the thermostat signal on-period divided by the length of the thermostat on-period plus off-period.

14. A system as set forth in claim 9 wherein the zone of greatest demand is determined as the zone which has the longest thermostat on-time.

15. A system as set forth in claim 9 wherein the zone of greatest demand is determined as the zone with the shortest thermostat off-time.

16. A system as set forth in claim 9 wherein said heating/cooling means is a forced air system.

17. A system as set forth in claim 9 wherein said heating/cooling system is a hydronic system.

18. A system as set forth in claim 11 wherein the damper in the duct leading to the zone of greatest demand is retained in an open state until a new zone of greatest demand is established.

19. A system as set forth in claim 12 wherein the damper in the duct leading to the zone of greatest demand is retained in an open state until a new zone of greatest demand is established.

20. A system as set forth in claim 9 wherein said zone controller means includes a microprocessor operating according to a stored program.

21. A system as set forth in claim 9 wherein said zone controller means includes means for integrating the on-periods of each of said thermostats to determine the zone of greatest demand.

22. A zoning control system for a heating/cooling system comprising
heating/cooling appliance means,
distribution system means for sending heating/cooling medicine to a plurality of zones,
means for controlling the flow of heat/cool to each zone and
a temperature sensing means supplying as an error signal the numerical difference between the desired zone setpoint temperature and the sensed zone temperature in each zone, said controller means having operative connections to said temperature sensing means, said means for controlling heat/cool flow and said heating/cooling appliance means, said controller being effective to determine the zone of greatest demand requiring the greatest amount of heat/cool and to proportion the amount of heat/cool being supplied to one or more other zones, in response to their thermal loads, relative to the zone of greatest demand requiring the most heat/cool.

* * * * *

UNITED STATES PATENT AND TRADEMARK OFFICE
CERTIFICATE OF CORRECTION

PATENT NO. : 5,024,265

DATED : June 18, 1991

INVENTOR(S) : ROBERT L. BUCHHOLZ, et al.

It is certified that error appears in the above-identified patent and that said Letters Patent is hereby corrected as shown below:

Column 8, line 30, cancel "medicine" and substitute --medium--.

Signed and Sealed this

First Day of December, 1992

Attest:

DOUGLAS B. COMER

Attesting Officer     Acting Commissioner of Patents and Trademarks